Figure 1:
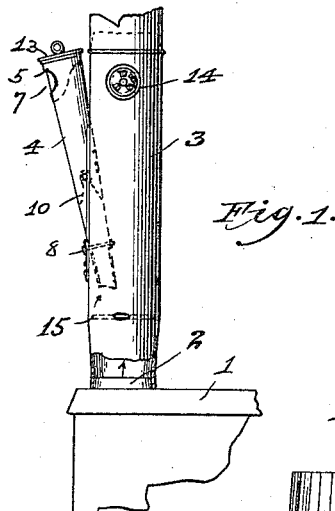

W. C. HOOD.
CALORIFIC APPARATUS.
APPLICATION FILED DEC. 5, 1914.

1,148,840.

Patented Aug. 3, 1915.

Witnesses,

Inventor:
William C. Hood
By Frank L. Belknap
Atty

UNITED STATES PATENT OFFICE.

WILLIAM C. HOOD, OF CHICAGO, ILLINOIS.

CALORIFIC APPARATUS.

1,148,840.  Specification of Letters Patent.  Patented Aug. 3, 1915.

Application filed December 5, 1914. Serial No. 875,655.

*To all whom it may concern:*

Be it known that I, WILLIAM C. HOOD, a citizen of the United States, residing in Chicago, in the county of Cook and State of Illinois, have invented certain new and useful Improvements in Calorific Apparatus, of which the following is a specification.

My invention relates to calorific apparatus and more particularly to that adapted for use with furnaces, stoves, and the like, of ordinary construction, though in its broader aspects the invention is not limited to use with any particular heating or power producing constructions.

The salient objects of the invention are to provide a simple and efficient means for increasing the efficiency of any calorific apparatus to which my invention is applied; to provide a construction in which an additional amount of oxygen is furnished to the combustion chamber by means of a conduit discharging into the pipe which conducts away the products of combustion; to provide an effectual means for preventing soot or other incompletely burned substance from being carried through the pipe which conducts away the products of combustion; to prevent the loss of heat ordinarily caused by the hot gases passing to the chimney; to provide a construction in which the additional supply of air is admitted into the pipe which conducts away the products of combustion, in a preheated condition and without any substantial obstruction of such pipe; to provide a construction in which the air admitted into the pipe is discharged thereinto in a direction diagonal to that of the pipe; to so position the auxiliary air conduit that its end nearest the combustion chamber is located within the combustion pipe and its opposite end positioned exterior thereof, the auxiliary air conduit being preferably tapered so that the end which is located within the combustion pipe is of relatively small diameter; to provide a construction in which the air admitted through the auxiliary conduit is caused to travel in a direction substantially transverse to that of the gases coming into the combustion pipe but at slightly angular relation thereto, thus causing the stream of air to traverse the stream of gases at an acute angle; to so construct and arrange the air conduit relative to the combustion pipe that the air is discharged into the latter from the air conduit in the proper angular relation without the necessity of changing the direction of travel of the air current, thus avoiding loss of efficiency due to friction; to provide a construction in which the auxiliary air conduit is formed in one of the lengths of the combustion pipe and is removable therewith as a unit, this unit being preferably positioned nearest the combustion chamber whereby the blast admitted through the air conduit forces the gases directly back into the combustion chamber; to provide a construction in which the air conduit discharges into the pipe which carries away the products of combustion at a point beyond that at which the damper is positioned, that is, the damper is interposed between the inner end of the air conduit and the combustion chamber; to provide a construction in which the air conduit becomes in effect a ventilating device when the damper in the pipe for conducting away the products of combustion is closed; to utilize the inner end of the air conduit as a stop for limiting the movement of travel of the damper; to provide a construction which can be economically manufactured and easily applied to a stove, furnace or other calorific apparatus by simply substituting one length of pipe for another; and in general to provide an improved construction of the character referred to.

The invention further resides in various details of construction and combinations of parts hereinafter set forth.

Figure 2:
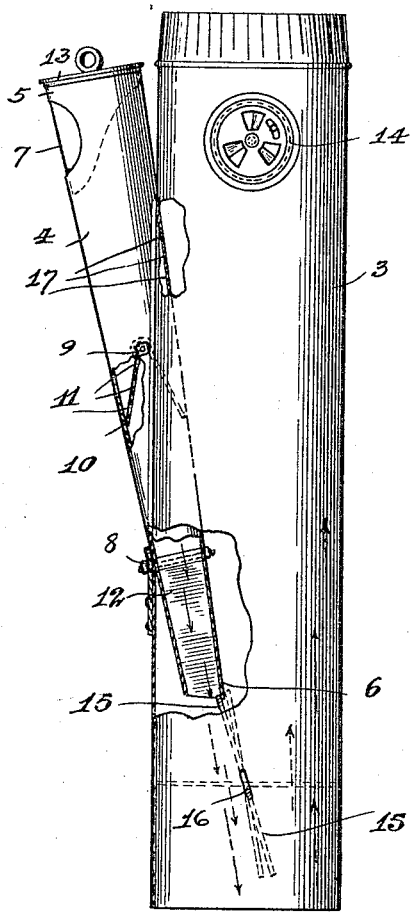
Figure 3:
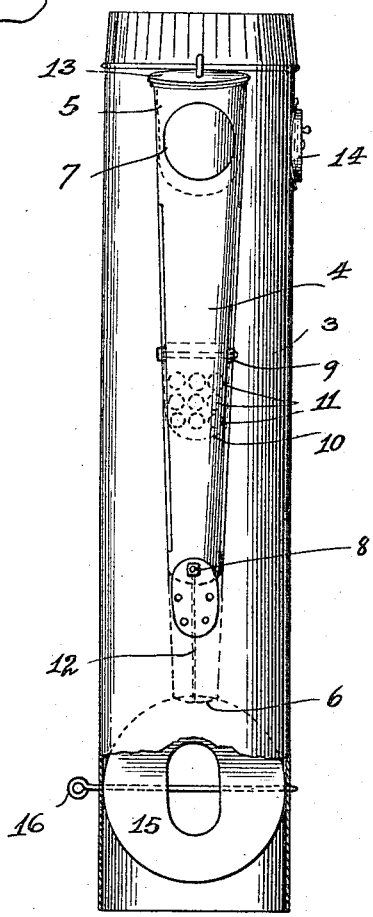

In the drawings—Figure 1 is a side elevation of a device embodying my invention, a fragment of the stove being shown. Fig. 2 is an enlarged side elevation partly in section, showing the pipe removed. Fig. 3 is a similar rear elevation.

Referring in detail to the embodiment of my invention shown in the drawings, 1 designates a stove having a discharge opening 2 through which the products of combustion are permitted to pass into the pipe 3 and from the latter are conducted away. In stoves, furnaces and other heating or power generating devices, the value of a large number of heat units is lost through the hot gases which pass into the chimney flue. Another source of loss is the amount of unburned fuel which is carried through the smoke pipe in the form of soot, etc.

In the present invention the hot gases and the unburned fuel are prevented from passing through the smoke pipe, in the following manner: In one of the lengths of the pipe, preferably that nearest the combustion chamber, there is formed an auxiliary air conduit 4 having its upper end 5 positioned outside of the pipe 3 through which the products of combustion pass. The lower end 6 of the air conduit 4 extends within the pipe 3 whereby air admitted through the opening 7 is discharged into the pipe 3 from the inner end 6 of the air conduit. As clearly shown in Figs. 1 and 2, the air conduit 4 extends diagonally relative to the pipe 3 and is preferably tapered. The angle at which the conduit 4 is placed with reference to the pipe 3 is preferably acute so that the blast of air discharged into the pipe meets the products of combustion in a substantially reverse direction of travel, but sufficiently diagonal so that in continuing their course the air currents will traverse the entire volume of gases entering the pipe 3 from the stove opening 2. It is to be noticed in this connection that the air currents which have been admitted to the conduit 4 pass in a substantially straight line throughout their course of travel. Moreover, the angular relation of the conduit to the pipe is such that the amount of conduit exposed to the heat of the pipe 3, is gradually increased from its outer end to its inner end.

The air conduit 4 is preferably of such a length that its upper end 5 is positioned wholly exterior of the pipe 3 and slightly spaced therefrom, and its inner end positioned entirely within the pipe 3, the conduit being secured to the pipe by means of bolts 8 and 9, the latter being employed for supporting a baffle plate 10 having holes 11 through which the air current passes. In certain instances it is found desirable to provide an additional dividing plate or fin 12 which separates the lower end of the conduit into two passages. The opening 7 is provided with a shut-off cap 13 whereby upon rotative adjustment of the cap the size of the opening 7 can be regulated. At a point about the same level as the opening 7, the pipe 3 is provided with a cold air check 14 of the usual construction, this check being positioned above the inner discharge end 6 of the conduit 4, while at the other or inner end the pipe 3 is provided with a damper 15 having the usual handle 16 extending exterior of the pipe. The arrangement of parts is such that the damper 15 is positioned between the inner end of the air conduit and the combustion chamber. The movement of this damper when rotated about its axis either to the left or right is preferably controlled by the lower end 6 of the air conduit. When the damper is opened wide the air from the conduit 4 is free to pass into the pipe 3, and because of its diagonal direction will traverse the entire volume of gases passing from the opening 2 into the pipe 3. This results in the hot gases and the soot or other incomplete combustion products being forced back into the combustion chamber. The section of the pipe 3 which carries the auxiliary air conduit 4 is preferably positioned sufficiently close to the combustion chamber so that draft of air will carry into the latter and result in a more complete burning of the fuel.

When the damper 15 is closed and the opening 7 uncovered, the main portion of the shaft through the pipe 3 will be upon the auxiliary conduit 4, thus aiding in ventilation and permitting any desired portion of the draft being employed in connection with the combustion chamber. By employing the diagonally extending air conduit which tapers to a comparatively small inner end, I am enabled to employ a relatively strong blast of air without any material mechanical obstruction of the pipe through which the products of combustion are to pass. Moreover, the blast of air moving in a substantially straight line carries back against the hot gases with considerable force, and in actual practice tends to lower the temperature at the upper end of the stove and to intensify the heat at the lower point in the stove, furnace or other device to which my invention is applied.

In many heating installations the smoke pipe is positioned in the cellar, and the heat radiating from such pipes often cause the building to catch fire, besides radiating a large amount of heat in a portion of the building where it is not desired. By causing a diagonal blast of air to traverse the contents of such pipes in the manner contemplated in my invention, I have succeeded in reducing the excessively high temperature of the smoke pipe to comparatively low.

In order to guard against any possibility of the gases in the pipe 3 passing out into the room through the opening 7, the air conduit 4 is provided with a plurality of apertures 17. These apertures are preferably located near the upper end of that portion of the air conduit which is within the pipe 3, and in case any gases should pass out of such pipe into the conduit 4 they will be drawn back through the apertures 17 into the pipe 3.

While I have shown and described a particular embodiment of my invention, it is obvious that it is not confined to the form or construction shown, and I do not desire to limit my invention except as specified in the appended claims.

I claim as my invention:

1. In a calorific apparatus, the combination with a combustion chamber and a pipe for conducting away the products of combustion therefrom, of means for causing a strong blast of air to be discharged across the products of combustion in said pipe in a direction toward said combustion chamber, said means comprising an air inlet conduit extending diagonally through the wall of said pipe and adapted to conduct the blast of air in a direction diagonal to that of the pipe for a considerable distance within said pipe before discharging it, and to discharge said blast of air in the same direction in which it is conducted into said pipe.

2. In calorific apparatus, the combination with a combustion chamber and a pipe for conducting away the products of combustion therefrom, of an air inlet conduit extending diagonally through the wall of said pipe, and having an open inner end terminating near that side of the pipe through which it extends, said air inlet conduit being arranged to discharge a blast of air out of said open end diagonally against the products of combustion in the pipe in a direction toward the combustion chamber.

3. In calorific apparatus, the combination with a combustion chamber and a pipe for conducting away the products of combustion therefrom, of a tapered air inlet conduit having its axis arranged diagonally with relation to the axis of said pipe, the larger end of said conduit being positioned externally of said pipe and its smaller end extending but a slight distance into said pipe and having an open end adapted to freely discharge a blast of air into said pipe and toward the combustion chamber in the same direction in which it is conducted through said inlet conduit.

4. In calorific apparatus, the combination with a combustion chamber and a pipe for conducting away the products of combustion therefrom, of an air inlet conduit extending diagonally through the wall of said pipe and adapted to discharge the blast of air diagonally across the products of combustion therein in a direction toward said combustion chamber, and a damper positioned in a portion of said pipe intermediate the end of said conduit nearest the combustion chamber and said combustion chamber, said damper in one position of adjustment substantially forming a continuation of said air inlet conduit.

WILLIAM C. HOOD.

Witnesses:
JOYCE M. LUTZ,
C. B. BELKNAP.